United States Patent
Dieckman et al.

(10) Patent No.: US 6,539,441 B1
(45) Date of Patent: Mar. 25, 2003

(54) MULTI-INSTANCE INPUT DEVICE CONTROL

(75) Inventors: Timothy D. Dieckman, San Francisco, CA (US); Aaron D. Standridge, Overland Park, KS (US)

(73) Assignee: Logitech Europe, S.A., Romanel-sur-Morges (CH)

( * ) Notice: Subject to any disclaimer, the term of this patent is extended or adjusted under 35 U.S.C. 154(b) by 0 days.

(21) Appl. No.: 09/438,012

(22) Filed: Nov. 10, 1999

(51) Int. Cl.$^7$ .............................................. G06F 13/12
(52) U.S. Cl. ............................ 710/73; 710/20; 710/36; 348/14.05
(58) Field of Search ............................... 710/7, 20, 36, 710/73, 72; 348/14.05

(56) References Cited

U.S. PATENT DOCUMENTS

| | | | | |
|---|---|---|---|---|
| 5,062,060 A | * | 10/1991 | Kolnick | 364/521 |
| 5,442,749 A | * | 8/1995 | Northcutt et al. | 709/219 |
| 6,067,624 A | * | 5/2000 | Kuno | 713/202 |
| 6,088,737 A | * | 7/2000 | Yano et al. | 709/235 |
| 6,133,941 A | * | 10/2000 | Ono | 348/14.05 |
| 6,239,836 B1 | * | 5/2001 | Suzuki et al. | 348/211.3 |
| 6,389,487 B1 | * | 5/2002 | Grooters | 710/51 |

* cited by examiner

*Primary Examiner*—Jeffrey Gaffin
*Assistant Examiner*—Harold Kim
(74) *Attorney, Agent, or Firm*—Townsend and Townsend and Crew LLP

(57) ABSTRACT

The present invention combines features of an executable process with the need for multiple application programs to share a single input device. The present invention provides an executable program implemented as a process that allows multiple applications to communicate with a single input device. This is achieved by loading the input device control executable program as a process. The executable program is a server thus allowing multiple application programs to interface with the same input device. The multi-instance input device control (MIIDC) executable program responds to each application program request as if the input device is open for the calling application program. Each application program is thus enabled to communicate with the input device instance without interrupting the operation of other application programs communicating with the input device. The input device instance keeps track of all the connections to it and multiplexes and resolves conflicting requests.

13 Claims, 3 Drawing Sheets

MULTI-INSTANCE INPUT DEVICE CONTROL

BACKGROUND OF THE INVENTION

The present invention relates to video cameras, and in particular to the interfacing of the video camera to application programs.

Traditionally, when one application connects to a video camera, all other applications are prevented from using that camera. When an application program calls to communicate with a video camera, the application program calls to the driver files or the dynamic link library (DLL or *.dll) files. Typically, a DLL provides one or more particular functions and a program accesses the function by creating a link to the DLL. DLL's can also contain data. Some DLL's are provided with the operating system (such as the Windows operating system) and are available for any operating system application. Other DLL's are written for a particular application and are loaded with the application program (such a video control application program). When a video control application program calls to connect to a video camera, at that point, the driver checks to make sure that no other application has opened the particular camera driver file (*.dll), and if no other has, the driver will open the particular driver file. Having done so, there now exists a single threaded connection between the video camera and the application program through the opened video camera driver file as seen in FIG. 1.

As depicted in FIG. 1, the driver file 14 is opened by the driver 12 which is called by the calling application program 10 and gets loaded in the calling application program's memory. Since the video camera driver file 14 has been opened by the application program 10, the next application which attempts to make a call to the video camera is prevented from doing so. This is because the video camera driver file has been loaded in the first application program's memory and is not available to be accessed by another calling program. Therefore, each application program which potentially makes calls to a video camera must account for the presence of another application program possibly already using the camera. Accordingly, such application programs are encumbered by the need to first check to determine whether another first application program was executed that had connected to the video camera, and if so the second calling program must have routines allowing it to negotiate the sharing of the camera. However such sharing is a single-instant one, meaning the that connection between the camera and the first application program would have to be broken (i.e. the first application program would have to be shut down or the video camera turned off) before the connection between camera and the second application program could be established. Authority, priority, and other security aspects as well as appropriate error handling must also be resolved by the communications between the two competing application programs. Presently, no application program even attempts to resolve any of these issues, and therefore if a connection between a calling program and a camera cannot be established, the unexpected application programs errors are resolved by the operating system which issues rather inelegant and undecipherable error messages leaving the ultimate user to only infer that a proper connection could not be established.

Application programs have continued to grow in size, flexibility and usability, and the trend has been to move away from large monolithic application programs to programs that are made of many smaller sub-programs. This building block approach provides many advantages such as ease of later modification and configurability. Moreover, operating system suppliers have also adopted such a modular approach and hence offer many standard sub-programs or objects that handle utility type functions such as queuing files to a printer, and loading and running printer DLL files to print files. The DLL files themselves are objects or sub-programs. And in an effort to a allow interoperability between objects and smaller sub-programs written in different high level programming languages, operating systems suppliers have developed models for executable programs, which can be compatible with each other at the binary level. One such model for binary code developed by Microsoft is the component object model (COM). The COM enables programmers to develop objects that can be accessed by any COM-compliant application. Although many benefits can be realized by transitioning from large monolithic application programs to sets of smaller sub-programs and objects, those advantages must be balanced against the burdens imposed by the need for the additional routines allowing for inter process communications amongst these sub-programs and objects.

Besides growing in complexity and usability, multi-unit application programs have been migrating from single-host sites to multiple host heterogeneous network environments. Consequently, it is now not unheard of to have a single application program be comprised of many different routines, each written in different high level programming languages and each residing on a separate computer, where all those computers are connected to each other across a network. In such implementations, the demands for efficient intra and inter-network and inter-process communications can take on a life of their own, detracting from the programmer's primary function of writing an application program. The programmer also has to handle the communications issues posed by spreading application programs across a network. Once again, operating systems suppliers have realized this challenge and potential detraction and have addressed it in various ways. Microsoft has extended the COM functionality by developing the distributed component object model (DCOM). DCOM is an extension of COM to support objects distributed across a network. Besides being an extension of COM, DCOM provides an interface which handles the details of network communication protocols allowing application programmers to focus on their primary function of developing application specific programs. DCOM is designed to address the enterprise requirements for distributed component architecture. For example, a business may want to build and deploy a customer order entry application that involves several different areas of functionality such as tax calculation, customer credit verification, inventory management, warranty update and order entry. Using DCOM the application may be built from five separate components and operated on a web server with access via a browser. Each component can reside on a different computer accessing a different database. The programmer can focus on application development and DCOM is there to handle the inter process communications aspects of the separate components of the application program. For example, DCOM would handle the integration of component communication with appropriate queues and the integration of component applications on a server with HTML-based internet applications.

SUMMARY OF THE INVENTION

The present invention combines features of an executable process with the need for multiple application programs to share a single input device, such as video camera. An input device such as a video camera is a peripheral device that is opened and remains open in response to a call from an application programs. The present invention provides an executable program implemented as a process that allows multiple applications to communicate with a single input device. This is achieved by creating a virtual interface (an instance) to the physical input device and by loading the input device control executable program into a process. An instance is an actual usage and the resulting virtual creation of a copy of an entity loaded into memory. The executable program process acts as a server thus allowing multiple application programs to interface with the same input device. The multi-instance input device control (MIIDC) executable program responds to each application program request as if the input device is open for the calling application program. Each application program is thus enabled to communicate with the input device instance without interrupting the operation of other application programs communicating with the same input device.

In one implementation, the (MIIDC) executable program can be a DCOM object. DCOM can also serve as an interface that allows multiple application programs to communicate with a single input device. The DCOM interface handles all interfacing operations such as: loading, executing, buffering, unloading and calling to the executable program. In the DCOM-based implementation, the MIIDC object itself is a DCOM server. The MIIDC program works by connecting to the input device in a DCOM object implemented as an executable server. Consequently, the MIIDC becomes a DCOM object implemented as an executable program, meaning that MIIDC is a process—like any other operating system (O/S) process—sharable by many applications. By placing the input device access program into a separate executable process, the input device is capable of being shared by multiple application programs. The DCOM interface appears to the application program as if it is being opened just for the application that calls to the DCOM object, while there's only one instance of the input device.

MIIDC is implemented so that for each actual hardware input device, the DCOM server creates a single input device instance and connects to the hardware device. When an application program connects with the input device control—which is an executable DCOM server—the DCOM server creates a MIIDC instance (and an interface) through which the application program communicates with the single input device instance. Data is provided for output by the single input device instance for each instance of the input device control, thus allowing simultaneous multiple applications to communicate with a single input device. Global settings are (MIIDC) instance specific. Additionally, the input device instance is protected so that multiple instances of the input device control program cannot perform tasks which would interfere with processing in another instance. Using this new approach, applications can be written which do not need to account for the presence of another application possibly already using the same input device.

For a further understanding of the nature and advantages of the present invention, reference should be made to the following description in conjunction with the accompanying drawings.

DESCRIPTION OF THE SPECIFIC EMBODIMENTS

Figure 1:
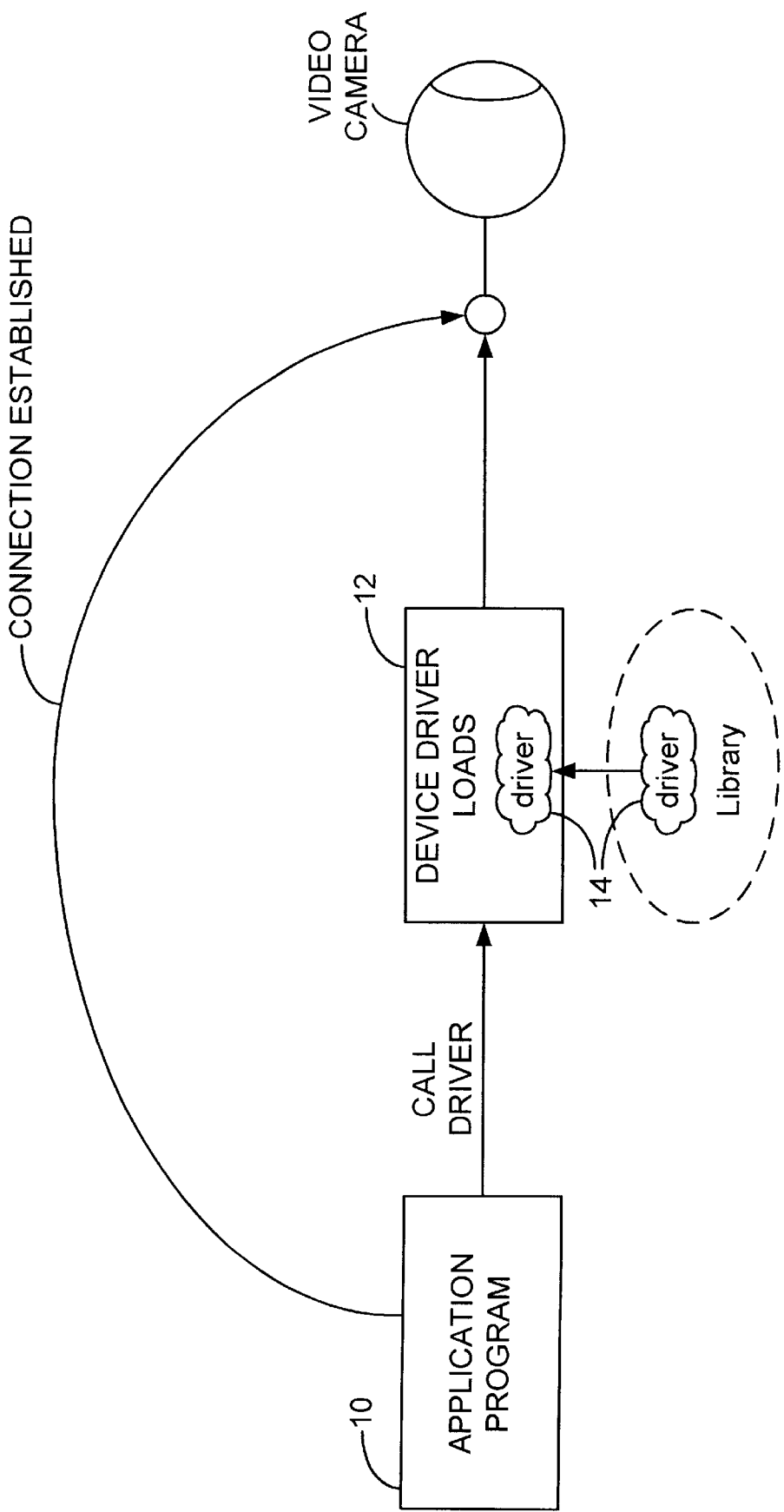
FIG. 1 is a block diagram showing the prior art method of a single application program communicating with a single video camera device.
Figure 2:
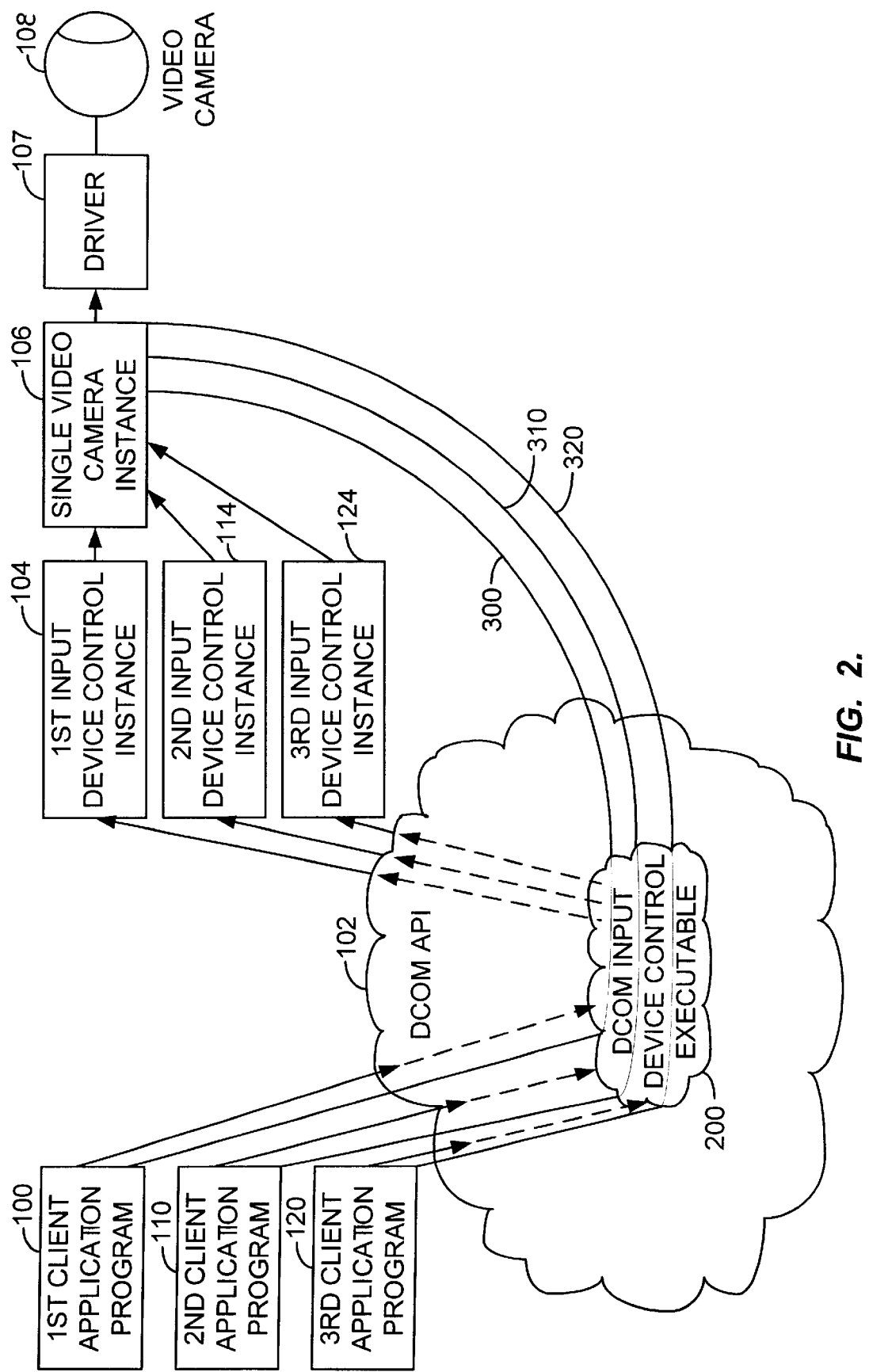
FIG. 2 is a block diagram depicting one embodiment of the present multi-instance input device control program.

FIG. 2 shows a block diagram depicting one embodiment of the present multi-instance input device control program (MIIDC). In this embodiment, the input device is a video camera, and the executable program is a DCOM executable server. This figure shows how multiple application programs may share a single video camera. Once a first application program 100 calls to connect to the video camera 108, the call is passed to the DCOM application program interface (API) 102. The appropriate Microsoft documentation or the Microsoft website may be referred to for a more detailed description of DCOM. The DCOM API 102 handles the loading of the DCOM executable program and establishes a connection from the application program to the DCOM executable program 200. The DCOM server 200 creates a single video camera instance 106 and a first MIIDC instance 104. Next, the DCOM server 200 connects the single video camera instance 106 to the video camera driver 107, the video camera driver 107 to the video camera device 108 and the first MIIDC instance 104 with the single video camera instance 106. The video camera instance 106 is a virtual interface to the physical video camera device 108. An instance is an actual usage and the virtual creation of a copy of an entity loaded into memory. In this embodiment all instance memory is allocated in the executable server. Finally the connection 300 is established allowing client application 100 to interact through the newly instantiated DCOM interface (single video camera instance) 106 with the video camera device 108.

Once a second application program 110 calls to connect to the video camera 108, the DCOM server 200 creates a second MIIDC instance 114, and connects it to the single video camera instance 106 thus allowing the second client application 110 to interact through the single video camera instance 106 with the video camera device 108 via the second established connection 310. Subsequent application programs calls 120, et. seq. also interact through the DCOM instantiated single video camera instance interface 106 with the video camera device 108 via the subsequently established connections 320, et seq.

Figure 3:
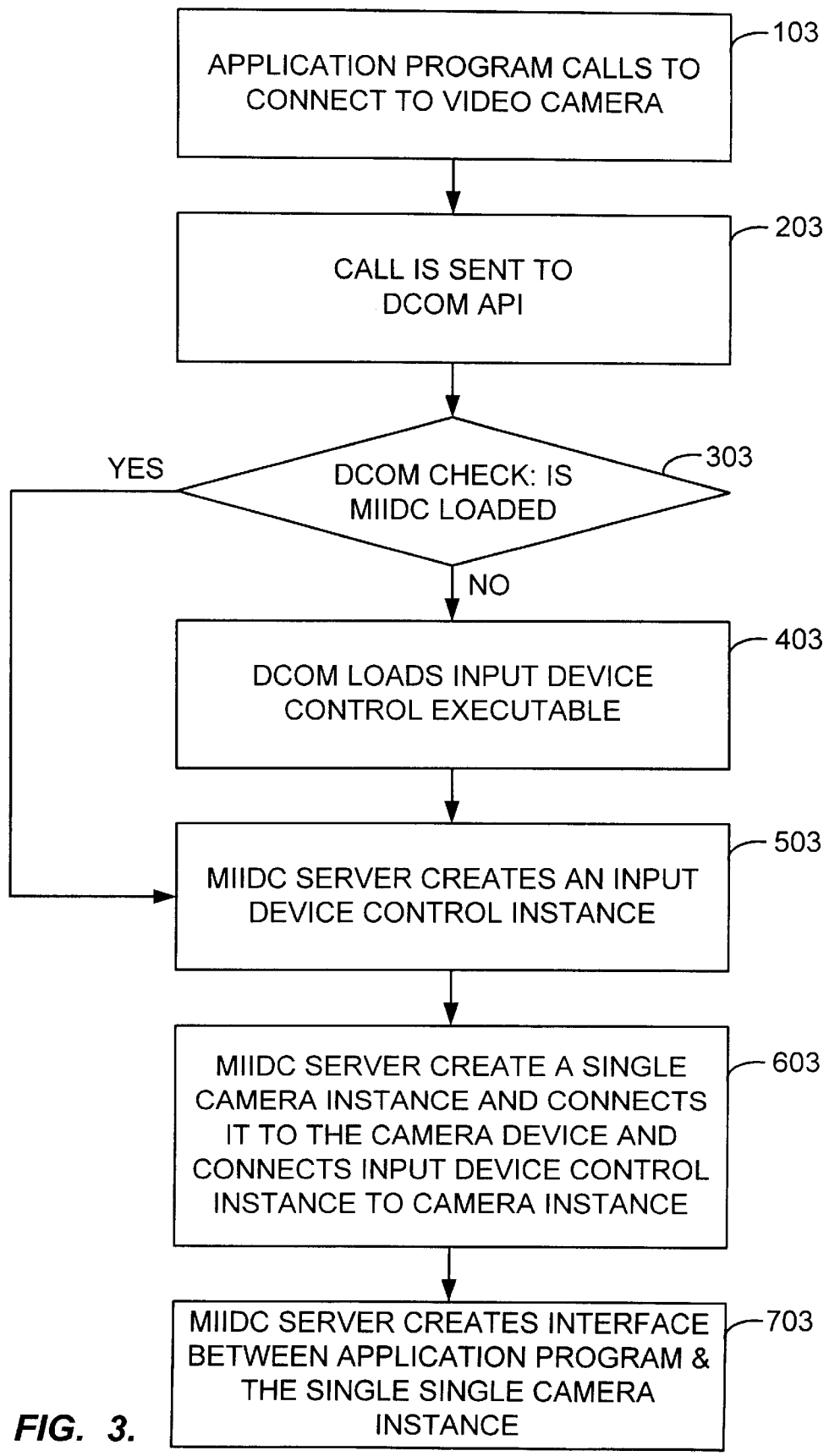
FIG. 3 is a flow chart showing the steps involved in an application connecting to a single input device.

FIG. 3 is a flow chart depicting the process of FIG. 2. Once a client application program calls to connect to the video camera device (step 103), the application program's call is sent to the DCOM API (step 203). Next, the DCOM API determines whether the DCOM implemented MIIDC executable is loaded or not. Typically the first client application program causes the MIIDC executable to be loaded. If the MIIDC executable server is not loaded, the DCOM API takes the call and causes the DCOM server to load the DCOM implemented MIIDC executable server (step 403). Next, the MIIDC server creates an input device control instance (step 503). If the MIIDC executable server had already been loaded, step 403 becomes unnecessary, and the next step after step 303 would be step 503. The MIIDC server next creates a single video camera instance and connects it to the video camera device, and connects the input device control instance to the single video camera instance (step 603). Finally, the MIIDC server creates an interface through which the first client application program communicates with the single camera instance (step 703).

The video camera instance 106 depicted on FIG. 2 is an interface with the video camera device that maintains the state of the input device control's instance. The input device instance 106 is a block of memory that maintains the necessary accounting of the number of connections that have been established with the video camera device, and the particular states of each of these connections. The video camera instance 106 also incorporates the logic necessary to prioritize the requests from each input device control instance connection and multiplex and resolve conflicting requests.

For example, the first input device instance may be requesting a video stream having a resolution of 640 by 480 pixels, while the second and third instances may be requesting video streams having 320 by 480 and 160 by 120 pixel resolutions respectively. In such a scenario, the video camera instance 106 would then decide to capture video at the largest resolution of 640 by 480 pixels and then scale it or crop it down to the lower resolutions being requested by the second and third instances. Following the same logic, if consequently the first video instance disconnects from the video camera, the video camera instance 106, would then resolve the requests from the second and third instances requesting 320 by 480 and 160 by 120 pixel resolutions respectively, by capturing video at the highest requested resolution of 320 by 480 pixels to satisfy the second instance's request and then scaling down or cropping the 320 by 480 pixels video stream down to 160 by 120 pixels to satisfy the third instance's request.

In another example involving three input device control instances, the first input device control instance may be sending a motion detection command to the virtual video camera device, while the other two instances are only requesting video streams. Now the video camera instance 106 would capture video at the highest demanded resolution and only pass that video stream through a motion detection calculation for the first input device control instance.

In yet another example involving three input device control instances, the second input device control instance may be requesting a text overlay on the video image, while the other two instances are only requesting video stream captures. Now, the video camera instance 106 would capture video at the highest demanded and only add the text overlay to the stream flowing to the second input device request.

As will be understood by those skilled in the art, the present invention may be embodied in other specific forms without departing from the essential characteristics thereof. For example, the MIIDC could be implemented as any other executable process other than a DCOM based process and any other interfacing protocol other than the DCOM interface could be used to allow multiple application programs to communicate with that process. These other embodiments are intended to be included within the scope of the present invention which is set froth in the following claims.

What is claimed is:

1. A input device control program which allows multiple client application programs to simultaneously communicate with an input device, wherein said input device control program in response to a first application program calling for a first connection to be established to said input device:
   i) passes said first application program's calls to a process' application program interface (API);
   ii) causes said process' network protocol to load said executable input device control program onto a process server;
   iii) causes said process server to create a single input device instance and connects said single input device instance to said input device;
   iv) causes said process server to create a first input device control instance and connects said first input device control instance to said single input device instance;
   v) causes said process server to create an interface through which said client application program communicates with said single input device instance, and
   vi) causes a second input device control instance to be created in response to a call from a second application program calling for a second connection to a said single input device and connecting said second input device control instance to said single input device instance allowing said second application program to communicate with said same single input device instance.

2. The input device control program of claim 1 wherein said process handles all details of network protocols comprising:
   loading said input device control program;
   calling to said input device control program with relevant input/output data;
   buffering input and output to/from said input device control program;
   executing said input device control program; and unloading said input device control program.

3. The input device program of claim 1, wherein said input device control program creates a virtual interface process and comprises routines for:
   a) video control comprising:
      i) initializing a video control;
      ii) taking digital still images;
      iii) recording digital video images;
      iv) obtaining video driver information;
      v) setting video camera properties; and
      vi) obtaining video camera properties;
   b) video camera event notification comprising:
      i) motion detection notification;
      ii) audiovisual AVI error notification;
      iii) camera detached notification; and
      iv) camera reattached notification.

4. The input device control program of claim 1 wherein said process is a distributed component object model (DCOM) executable program.

5. The input device control program of claim 1 wherein said input device comprises an electronic camera.

6. A distributed component object model (DCOM) executable input device control program which allows multiple client application programs to simultaneously communicate with an input device, wherein said program in response to a first application program calling for a first connection to be established to said input device:
   i) passes said first application program's calls to a DCOM application program interface (API);
   ii) causes said DCOM's network protocol to load said executable input device control program onto a DCOM server and;
   iii) causes said DCOM server to create a single input device instance and connects said single input device instance to said input device;
   iv) causes said DCOM server to create a first input device control instance and connects said first input device control instance to said single input device instance;
   v) causes said DCOM server to create an interface through which said client application program communicates with said single input device instance, and
   vi) creates a second input device control instance to be created in response to a call from a second application program calling for a second connection to a said single input device and connecting said input device instance to said single input device instance allowing said second application program to communicate with said same single input device instance.

7. The input device control program of claim 6 wherein said input device comprises an electronic camera.

8. A method for allowing multiple client application programs to communicate with a single input device, said method comprising:

i) passing a first application program's calls to a process' application program interface (API);

ii) causing said process' network protocol to load an executable input device control program onto a process server and;

iii) causing said process server to create a single input device instance and connecting said single input device instance to said single input device;

iv) causing said process server to create a first input device control instance and connecting said first input device control instance to said single input device instance;

v) causing said process server to create an interface through which said client application program communicates with said single input device instance, and vi) creating a second input device control instance in response to a call from a second application program calling for a second connection to said single input device and connecting said second input device control instance to said single input device instance to create an interface through which said second client application communicates with said same single input device instance.

9. The method of claim 8 wherein said executable input device control program is a distributed component object model (DCOM) executable program.

10. The method of claim 8 wherein said process is a DCOM process.

11. The method of claim 8 wherein said input device comprises an electronic camera.

12. A computer program product, comprising:

a computer useable medium having computer readable code embodied therein for causing multiple client application programs to communicate with a single input device, the computer code comprising instructions for:

passing a first application program's calls to a process' application program interface (API);

causing said process' network protocol to load an executable input device control program onto a process server and;

causing said process server to create a single input device instance and connecting said single input device instance to said single input device;

causing said process server to create a first input device control instance and connecting said first input device control instance to said single input device instance;

causing said process server to create an interface through which said client application program communicates with said single input device instance, and creating a second input device control instance in response to a call from a second application program calling for a second connection to said single input device and connecting said second input device control instance to said single input device instance to create an interface through which said second client application communicates with said same single input device instance.

13. The method of claim 12 wherein said input device comprises an electronic camera.

* * * * *